US012806522B2

(12) United States Patent
Raji et al.

(10) Patent No.: US 12,806,522 B2
(45) Date of Patent: Nov. 24, 2026

(54) VIDEO GAME BACKGROUND AUDIO GENERATION

(71) Applicant: Electronic Arts Inc., Redwood City, CA (US)

(72) Inventors: Shahab Raji, Foster City, CA (US); Igor Borovikov, Foster City, CA (US)

(73) Assignee: ELECTRONIC ARTS INC., Redwood City, CA (US)

( * ) Notice: Subject to any disclaimer, the term of this patent is extended or adjusted under 35 U.S.C. 154(b) by 127 days.

(21) Appl. No.: 18/621,767

(22) Filed: Mar. 29, 2024

(65) Prior Publication Data

US 2025/0303293 A1 Oct. 2, 2025

(51) Int. Cl.

| | |
|---|---|
| ***A63F 13/54*** | (2014.01) |
| ***G10L 15/02*** | (2006.01) |
| ***G10L 15/18*** | (2013.01) |
| ***G10L 15/183*** | (2013.01) |

(52) U.S. Cl.

CPC .............. *A63F 13/54* (2014.09); *G10L 15/02* (2013.01); *G10L 15/1807* (2013.01); *G10L 15/183* (2013.01)

(58) Field of Classification Search

CPC ......... A63F 13/54; G10L 15/02; G10L 15/18; G10L 15/183; G10L 15/1807

See application file for complete search history.

(56) References Cited

U.S. PATENT DOCUMENTS

| | | | | |
|---|---|---|---|---|
| 7,096,183 | B2 * | 8/2006 | Junqua | G10L 13/08<br>704/E13.011 |
| 11,605,388 | B1 * | 3/2023 | Gupta | A63F 13/215 |
| 11,790,884 | B1 * | 10/2023 | Shakeri | G10L 21/007<br>704/258 |
| 12,296,265 | B1 * | 5/2025 | Gupta | G10L 19/04 |
| 12,462,787 | B1 * | 11/2025 | Sydorchuk | G06F 40/30 |
| 2006/0136556 | A1 * | 6/2006 | Stevens | H04H 60/06<br>707/E17.101 |
| 2007/0163427 | A1 * | 7/2007 | Rigopulos | G10H 1/0008<br>84/609 |
| 2018/0032612 | A1 * | 2/2018 | Kariman | G06F 16/164 |
| 2018/0308487 | A1 * | 10/2018 | Goel | G10L 15/1815 |
| 2020/0329331 | A1 * | 10/2020 | Cappello | G06N 20/00 |
| 2021/0074266 | A1 * | 3/2021 | Lu | G10L 19/005 |

(Continued)

OTHER PUBLICATIONS

Brian Lester, Rami Al-Rfou, and Noah Constant. "The power of scale for parameter-efficient prompt tuning." arXiv preprint arXiv:2104, dated 2021.

(Continued)

*Primary Examiner* — Xuan M Thai
*Assistant Examiner* — Shauna-Kay Hall
(74) *Attorney, Agent, or Firm* — Gray Ice Higdon

(57) ABSTRACT

This specification describes a method for generating background audio in a video game. The method is implemented by one or more processors and the method comprises: obtaining, by one or more of the processors, text data comprising text for speech audio that is to be present in the background audio; obtaining, by one or more of the processors, contextual data comprising data descriptive of an environment in the video game; and generating, by one or more of the processors, the background audio based upon processing the text data and the contextual data using one or more machine learning models.

15 Claims, 6 Drawing Sheets

(56) References Cited

U.S. PATENT DOCUMENTS

| | | | | |
|---|---|---|---|---|
| 2021/0097976 | A1* | 4/2021 | Chicote | G06N 3/0442 |
| 2021/0151029 | A1* | 5/2021 | Gururani | G06N 3/0455 |
| 2024/0221767 | A1* | 7/2024 | Chae | G10L 21/02 |
| 2025/0177863 | A1* | 6/2025 | Yip | A63F 13/54 |

OTHER PUBLICATIONS

Yaqing Wang, et al. "Adamix: Mixture-of-adapter for parameter-efficient tuning of large language models." arXiv preprint arXiv:2205.12410 1.2, dated 2022.
Tu Vu, et al. "Spot: Better frozen model adaptation through soft prompt transfer." arXiv preprint arXiv:2110.07904, dated 2021.
Minchan Kim, et al. "Expressive text-to-speech using style tag." arXiv preprint arXiv:2104.00436, dated 2021.
Yinghao Li, Cong Han, and Nima Mesgarani. "StyleTTS: A style-based generative model for natural and diverse text-to-speech synthesis." arXiv preprint arXiv:2205.15439, dated 2022.
Haohe Liu et. al., "AudioLDM: Text-to-audio generation with latent diffusion models," arXiv preprint, arXiv:2301.12503, dated 2023.

* cited by examiner

VIDEO GAME BACKGROUND AUDIO GENERATION

BACKGROUND

Video games may comprise a variety of virtual environments. In order to provide an immersive experience for a player, appropriate background audio with sounds a player may expect to hear in that particular virtual environment can be played whilst the player is in the environment. This may include appropriate sound effects such as traffic noise if the environment is an urban location or chanting if the environment is a sports stadium for example. In addition, where the environment includes non-player characters, the background audio may include conversational dialogue between non-player characters. In some prior art methods however, these background conversations may be short, repetitive and unrealistic, thereby breaking player immersion. Improved methods of background audio generation in video games are therefore required.

SUMMARY

In accordance with a first aspect, there is provided a method for generating background audio in a video game. The method is implemented by one or more processors and the method comprises: obtaining, by one or more of the processors, text data comprising text for speech audio that is to be present in the background audio; obtaining, by one or more of the processors, contextual data comprising data descriptive of an environment in the video game; and generating, by one or more of the processors, the background audio based upon processing the text data and the contextual data using one or more machine learning models.

In accordance with a second aspect, there is provided a system comprising: one or more processors; and one or more computer readable storage media comprising processor readable instructions to cause the one or more processors to carry out a method comprising: obtaining, by one or more of the processors, text data comprising text for speech audio that is to be present in the background audio; obtaining, by one or more of the processors, contextual data comprising data descriptive of an environment in the video game; and generating, by one or more of the processors, the background audio based upon processing the text data and the contextual data using one or more machine learning models.

In accordance with a third aspect, there is provided one or more non-transitory computer-readable storage media comprising instructions which, when executed by one or more processors, cause the one or more processors to carry out a method comprising: obtaining, by one or more of the processors, text data comprising text for speech audio that is to be present in the background audio; obtaining, by one or more of the processors, contextual data comprising data descriptive of an environment in the video game; and generating, by one or more of the processors, the background audio based upon processing the text data and the contextual data using one or more machine learning models.

DETAILED DESCRIPTION

General Definitions

Figure 1:
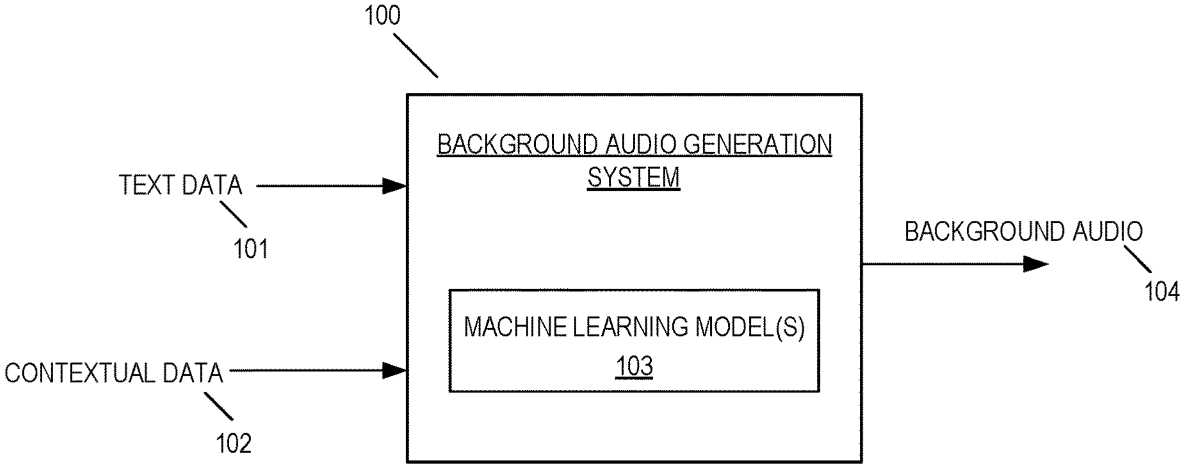
FIG. 1 is a schematic block diagram illustrating an example background audio generation system according to an embodiment.

The following terms are defined to aid the present disclosure and not limit the scope thereof.

A "user" or "player", as used in some embodiments herein, refers to an individual and/or the computing system(s) or device(s) corresponding to (e.g., associated with, operated by) that individual.

A "video game" as used in some embodiments described herein, is a virtual interactive environment in which players engage.

"Speech" as used in some embodiments described herein may include sounds in the form of spoken words in any language, whether real or invented and/or other utterances including paralinguistics such as sighs, yawns, moans etc. "Speech audio" refers to audio (e.g. audio data) which includes or represents speech, and may comprise data in any suitable audio file format whether in a compressed or uncompressed format.

"Text" as used in some in embodiments described herein refers to any suitable representation of characters, words or symbols that may be used to represent language and/or speech. As noted above, this may include all types of utterances such as paralinguistics. In some cases, text data may be input by use of a keyboard or obtained from a selection on a user interface using other input devices such as a mouse or touch screen. The text data may be stored in memory in any suitable compressed or uncompressed format, e.g. ASCII format.

"Prosody" as used in some embodiments described herein refers to the way in which speech is expressed, e.g. the intonation, pitch, volume, timing (e.g. rhythm, speech rate) and/or tone of speech. It may include pronunciation aspects such as articulation or stress and/or performance aspects such as intensity/arousal or valence. In some embodiments described herein prosody may be represented by prosodic features which may be derived from pitch and/or volume contours, timing information, etc. and may be predicted using the models described herein.

"Speech signal" as used in some embodiments described herein may include any suitable representation or encoding of a waveform and in particular may comprise a time-domain waveform, e.g. in digital form. The encoding may be compressed or uncompressed and have any suitable sampling rate and bit-depth.

The systems and methods described in this specification enable the generation of background audio in a video game. Video games may comprise a variety of virtual environments. When a player is in a virtual environment, appropriate background audio should be played by the video game in order to provide an immersive experience for the player. Certain environments may be crowded locations in which a player may expect to hear background conversations in such locations. For example, the environment may be a sports stadium, a cafe, a bar, a transport hub such as a train station or airport, and a busy street amongst others. In some prior art methods, background audio may be generated by randomly mixing pre-recorded soundtracks and lines of dialogue. This may produce background audio that lacks variety, is repetitive, and with unrealistic conversational dialogue.

The systems and methods described in this specification enable the generation of background audio in a video game that includes more realistic and dynamic background conversations and audio effects through the use of machine learning models and appropriate contextual data.

FIG. 1 is a schematic block diagram illustrating an example background audio generation system 100. The system 100 may be implemented by one or more processors located in one or more locations. The system 100 may comprise a server, desktop computer, a mobile device such as a laptop, smartphone or tablet, or any other suitable computing apparatus. The system 100 may be a distributed system or cloud-based system. The system 100 may be part of a video game or may interface with a video game to enable real-time generation of background audio for the video game. Alternatively, the system 100 may be an "offline" system for generating background audio during the development of the video game. The generated background audio may be stored and made accessible to the video game for subsequent retrieval by the video game when the player is in a corresponding virtual environment.

The system 100 is configured to obtain text data 101 comprising text for speech audio that is to be present in the background audio. That is, the text data 101 may comprise text corresponding to a dialogue between two or more persons. The dialogue may be pre-written manually or generated using an appropriate dialogue generation system. The text data 101 provides the initial basis for a background conversation to be present in the background audio that is to be generated.

The system 100 is further configured to obtain contextual data 102 comprising data descriptive of an environment in the video game. For example, the contextual data may describe the type of environment, e.g. a stadium, café, bar, train station, airport, street, office building etc. The contextual data 102 may also provide data relating to/descriptions of the background characters that are to speak the background dialogue. For example, the data may include the characters' age, gender, speaking style and accent amongst others. The contextual data 102 may also include data indicating the location of the environment, the weather for the environment, the time of day, the date, an event type (e.g. a soccer game, a baseball game, a festival etc.) and/or any other details describing the environment. The contextual data 102 can be specified as text in natural language.

The contextual data 102 may also comprise game state data. The game state data may be indicative of a current game state of the video game and may include data regarding the player's character, choices, and progress in the game so far. In this way, the background dialogue may dynamically reflect a player's actions and choices made in the video game.

The contextual data 102 may also comprise real-world data including the location of the player, current news, sports and weather feeds, factual data and/or any other data obtained from the Internet in order to provide further data for generating realistic conversational dialogue. For example, in a sports stadium, the background dialogue may comprise a discussion of a team's most recent real-world matches.

The system 100 comprises one or more machine learning models 103 configured to process the text data 101 and the contextual data 102 to generate the background audio 104. For example, the background audio 104 may include one or more sound effects based upon the contextual data 102. The one or more machine learning models 103 may be configured to generate speech audio based upon the text data 101 and the contextual data 102. For example, the one or more machine learning models 103 may be configured to modify the text data 101 based upon the contextual data 102 to generate modified text data, thereby tailoring the text dialogue according to the contextual data 102. The system 100 may be configured to convert the modified text data to speech audio based upon the contextual data 102 using the one or more machine learning models 103. For example, the dialogue can be spoken in a way specified by the contextual data 102. The system 100 may be configured to mix the background sound effects and the generated speech audio to provide the final background audio 104 as an output. The generated background audio may therefore be customized according to the contextual data 102 and the specified environment. Further details regarding the processing carried out by the one or more machine learning models 103 is described below.

By providing different inputs, the system may be used to generate multiple background audio samples for a variety of different environments. The background audio samples can differ in terms of the dialogue content, the characters that are speaking the dialogue, how the dialogue is spoken, and any background sound effects as appropriate for the environment. Thus, a variety of realistic sounding background audio samples can be efficiently generated. The inputs may be specified, at least in part, if not all, in natural language. This provides a user friendly and efficient means of providing input to the system.

As discussed above, if the system is used as part of the video game development process, the generated background audio samples may be stored and subsequently retrieved by a video game at runtime. For example, the generated background audio samples may be stored with appropriate metadata or labels to enable search and retrieval. The video game may retrieve background audio at any suitable point. For example, the video game may retrieve background audio when a new level or environment is being loaded. The video game may play the background audio when a player reaches a certain location in the environment or using any appropriate trigger.

Alternatively, or in addition, the system may be used for real-time dynamic generation of background audio. At any suitable point when the video game is running, the video game may generate appropriate inputs and request background audio from the background audio generation system. The video game may then play the generated background audio according to a suitable triggering criterion. In such cases, the contextual data may comprise game state data and the generated background audio may reflect the current game state to further enhance player immersion.

Figure 2:
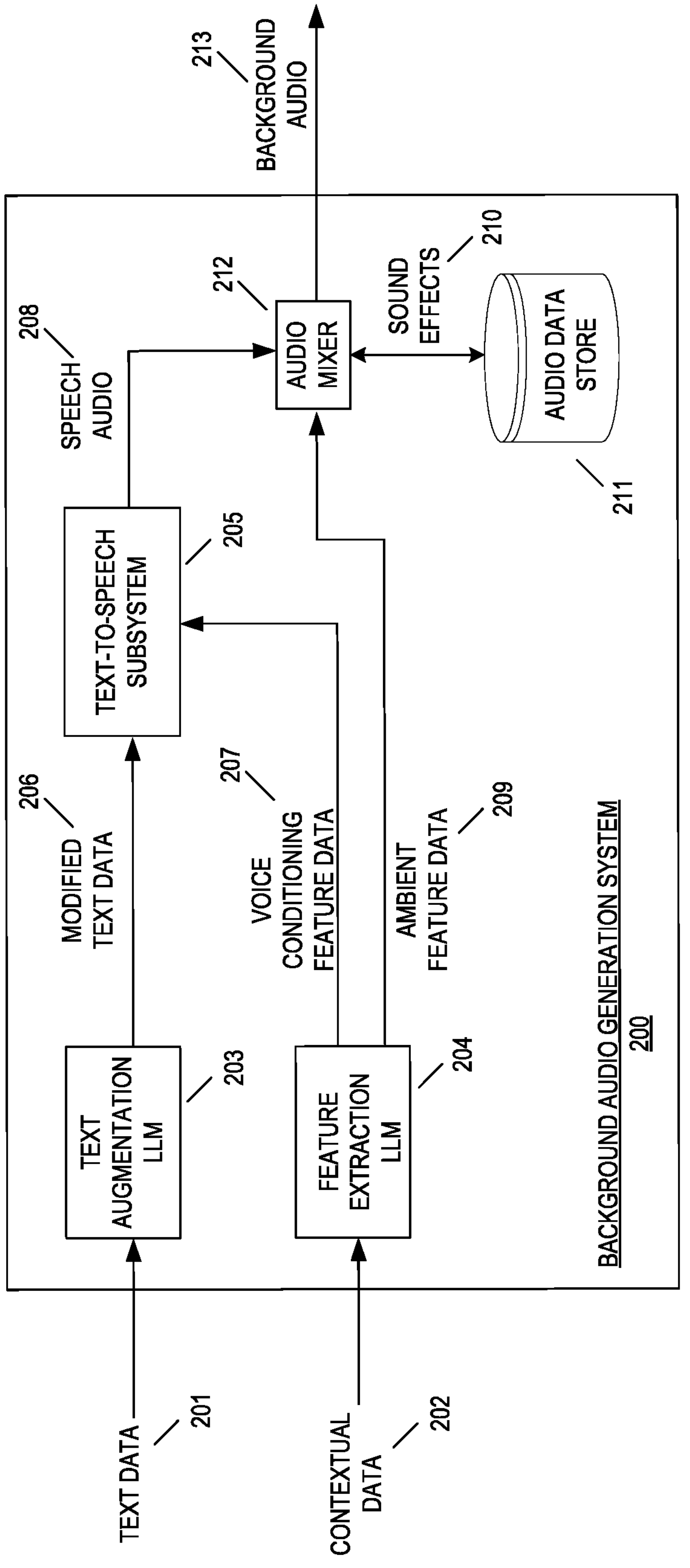
FIG. 2 is a schematic block diagram of an example background audio generation system in more detail according to an embodiment.

FIG. 2 shows an example embodiment of a background audio generation system 200 in more detail. Similar to the above, the system 200 is configured to obtain text data 201 and contextual data 202. The system 200 comprises a plurality of machine learning models configured to process these to generate background audio. The plurality of machine learning models comprises a text augmentation large language model (LLM) 203, a feature extraction LLM 204 and a text-to-speech subsystem 205.

The text augmentation LLM 203 may be configured to modify the text data 201 based upon the contextual data 202 to provide modified text data 206. For example, the modified text data 206 may comprise one or more additional paralinguistic tokens indicating laughs, sighing, yawning, and grunting amongst others to enhance the realism of the dialogue when spoken. In another example, the text data 201 may be modified based upon a speaking style indicated in the contextual data 202. For example, the contextual data 202 may specify a causal style or a formal style of speech and the text data may be modified to include additional words/phrases or to substitute words/phrases according to the speech style. In a further example, the contextual data 202 may indicate where a speaker is from, and the text data 201 may be modified to use words/phrases corresponding to speakers from that locale. In another example, the contextual data 202 may indicate a personality of a speaker and the text data 201 may be modified to reflect the specified personality traits, e.g. for a shy or nervous speaker, the text data 201 may be modified to include hesitancies.

The feature extraction LLM 204 may be configured to extract voice conditioning feature data 207 from the contextual data 202. That is, the feature extraction LLM 204 may parse the contextual data 202, which may be in the form of a natural language text description, to extract features relating to how the speech audio should sound. For example, the voice conditioning feature data 207 may comprise prosody data. The prosody data may comprise labels or tags indicative of a speech style, emotion, expression and/or tone. In another example, the voice conditioning feature data 207 may comprise speaker characteristic data such as the speaker's identity, age, gender, and/or accent. Where the contextual data 202 comprises game state data, the speaker identity may be determined based upon the game state data and the player's decisions made during the game. Persistent personalities may be selected to follow a player through the game for example.

The prosody data may comprise lower-level prosody features such as the volume and/or pitch of the desired speech audio. The prosody data may comprise prosodic statistical features. For example, the prosody data may comprise one or more statistical features of a pitch contour and/or a volume contour for the generated speech signal. The one or more statistical features may comprise: a mean, a variance, a maximum and a minimum of a pitch contour for the speech audio; and/or a mean, a variance, and a maximum of a volume contour for the speech audio. The lower-level prosody features may be reflective of the speech style and/or speaker characteristics noted above.

The system 200 may further comprise a prosody encoder configured to generate a prosody embedding (a vector or tensor of numerical values) from the prosody data to provide as input to the text-to-speech subsystem 205. The exact form of the prosody data may be chosen based upon the configuration of the text-to-speech subsystem 205 and the acceptable prosody inputs of the subsystem 205.

Thus, the text augmentation LLM 203 focuses on customizing the content of the dialogue according to the contextual data 202 whilst the feature extraction LLM 204 focuses on customizing how the speech is to be spoken according to the contextual data 202. Both LLMs may be based upon any appropriate LLM architecture and trained using any suitable method for training LLMs. For example, an off-the-shelf pre-trained LLM may be used as the basis for both LLMs and then fine-tuned to carried out their necessary functions. The LLMs may be fine-tuned using a training dataset comprising respective training inputs and corresponding target outputs that the LLM is expected to produce for the training input.

In some embodiments, all of the parameters of an LLM may be adjusted during fine-tuning. In other embodiments, additional parameters may be added to the LLM and during fine-tuning, only the additional parameters are adjusted whilst the original parameters of the pre-trained LLM are held fixed. Further details of fine-tuning LLMs can be found in Lester et. al., "The power of scale for parameter-efficient prompt tuning", arXiv preprint ariXiv: 2104.08691 (2021), and Wang et. al., "Adamix: Mixture-of-adapter for parameter-efficient tuning of large language models," arXiv preprint, arXiv: 2205.12410 (2022), both of which are hereby incorporated by reference in their entirety.

Whilst the text augmentation LLM 203 and the feature extraction LLM 204 are described as being separate LLMs, it will be appreciated that a single LLM may be trained to perform the functions of both LLMs. As discussed above, the text data 201 and the contextual data 202 may comprise text in the form of natural language. This may be a natural language prompt that specifies the task to be performed by the LLM. The system 200 may be configured to tokenize the natural language text or the text/conditional data may be tokenized externally beforehand and provided as input to the LLM for processing. The tokens may be drawn from any suitable vocabulary of tokens and may comprise sub-word units such as word pieces, characters, and any other suitable form of token.

The text-to-speech subsystem 205 may be configured to generate speech audio 208 based upon the modified text data 206 and the voice conditioning feature data 207. That is, the speech audio 208 may comprise utterances corresponding to the modified text data 206 and spoken according to the voice conditioning feature data 207. The text-to-speech subsystem 205 may be a multi-speaker text-to-speech model configured to generate spoken dialogue using a different speaker identity for each respective character. Each character's dialogue lines may be labelled in the text data 201. As discussed above, the contextual data 202 may comprise speaker characteristic data for each of the characters and the voice conditioning feature data 207 may be used by the text-to-speech subsystem 205 to generate or retrieve appropriate character voices.

Any appropriate text-to-speech machine learning model may be used. For example, the model may comprise an encoder-decoder type architecture comprising a plurality of neural network layers. The encoder may comprise a text encoder configured to process the modified text data to generate a text embedding. The model may comprise a prosody encoder as discussed above to generate a prosody embedding. The decoder may be configured to generate speech audio from the text embedding conditioned on the prosody embedding. The decoder may generate an output autoregressively or non-autoregressively as deemed appropriate by a person skilled in the art. A suitable text-to-speech machine learning model is described in Kim et. al., "Expressive text-to-speech using style tag," arXiv preprint arXiv: 2104.00436 (2021), which is hereby incorporated by reference in its entirety.

The feature extraction LLM 204 may be configured to extract ambient feature data 209 from the contextual data 202. That is, the feature extraction LLM 204 may parse the contextual data 202, which may be in the form of a natural language text description, to extract features relating to the environment that are relevant for selecting/generating any background sound effects. For example, the ambient feature data 209 may be indicative of an event type, type of environment, a room size, a size of a crowd, a noise type amongst others. The ambient feature data 209 may comprise labels or tags or any other form of data that may be used to query and retrieve corresponding sound effects 210 from an audio data store 211. Alternatively, the ambient feature data 209 may comprise a text description that may be provided to a sound effect generation subsystem to generate corresponding sound effects. Example sound effects may include, the sound of transportation such as cars, trains, and airplanes, crowd noise, announcements, applause, dogs barking, birdsong, and other animal noises, noises from electronic devices such as radios, telephones and cash registers, the sound of church bells and clock chimes, the sounds of bottles and glasses clinking, and any other appropriate sound effects. Further details regarding generating audio from text may be found in Liu et. al., "AudioLDM: Text-to-audio generation with latent diffusion models," arXiv preprint, arXiv: 2301.12503 (2023), which is hereby incorporated by reference in its entirety.

In the above, whilst a single feature extraction LLM 204 is described as performing both the functions of extracting voice conditional feature data 207 and ambient feature data 209, it will be appreciated that separate LLMs may be used to extract the feature data independently.

The system 200 may further comprise an audio mixer 212 configured to mix the generated speech audio 208 and the obtained sound effects 210 to generate the background audio 213. The audio mixer 212 may perform the audio mixing using any appropriate signal processing methods.

As discussed above, the system can be used to generate further background audio samples by providing different text data and/or contextual data as input. The generated background audio samples may be stored for subsequent retrieval by a video game during runtime or the background audio may be generated in real-time according to a request from the video game whilst the video game is running.

Figure 3:
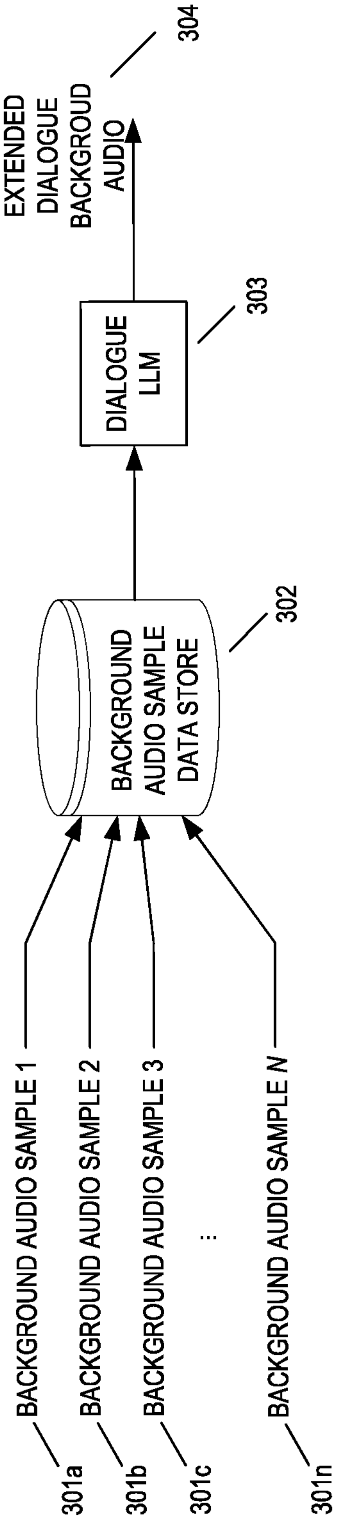
FIG. 3 is a schematic block diagram of an example system for generating background audio with extended dialogue according to an embodiment.

In some embodiments, the generated background audio may be combined to generate background audio with an extended dialogue sequence. This is illustrated in the exemplary embodiment of FIG. 3. A plurality of background audio samples 301*a* . . . n may be generated as discussed above. The plurality of background audio samples 301*a* . . . n may be stored in a background audio sample data store 302. A dialogue LLM 303 may be configured to select and combine a subset of (or all of) the plurality of background audio samples 301*a* . . . n to generate background audio with extended dialogue 304 in a way that sounds natural and realistic. The dialogue LLM 303 may be provided with an input prompt provide guidance to the dialogue LLM 303 in selecting and combining the subset of background audio samples 301*a* . . . n. For example, the input prompt may specify a particular conversational topic and the dialogue LLM 303 may select and combine background audio samples related to that topic. The subset of background audio samples may be combined any suitable way. For example, the dialogue LLM 303 may determine an order in which to sequentially combine the background audio samples. In another example, a portion of one background audio sample may be extracted and combined with an extract of a second background audio sample. The dialogue LLM 303 may take any suitable form and be trained using any suitable method as deemed appropriate by a person skilled in the art. For example, the fine-tuning discussed above may be used.

Figure 4:
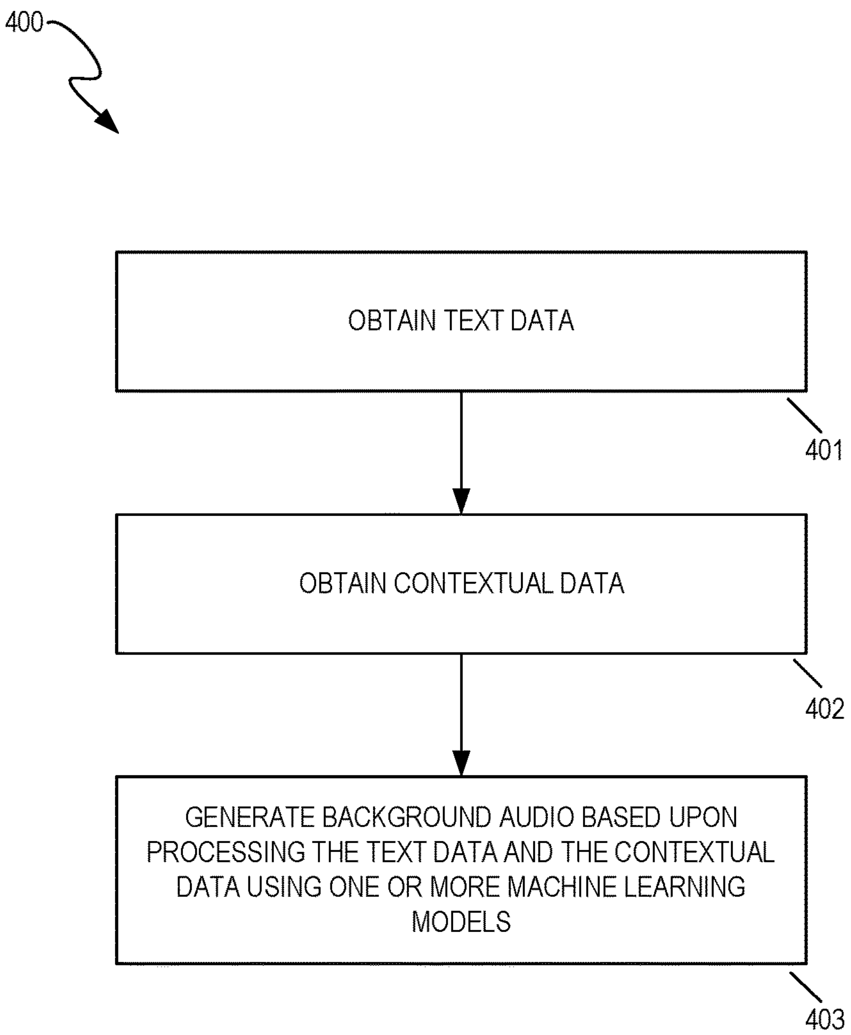
FIG. 4 is a flowchart illustrating an example method for generating background audio in a video game according to an embodiment.

FIG. 4 is a flow diagram illustrating an example method 400 for generating background audio in a video game. The processing shown in FIG. 4 may be carried out by the systems of FIGS. 1 and 2.

At step 401, text data is obtained by one or more processors. The text data comprises text for speech audio that is to be present in the background audio. As discussed above, the text data may comprise an initial basis for background conversational dialogue that is to be present in the background audio. The text data may be pre-written manually or may be generated by a dialogue generation system.

At step 402, contextual data is obtained by one or more of the processors. The contextual data comprises data descriptive of an environment in the video game. As discussed above, the contextual data may describe the type of environment. For example, the contextual data may include data indicating the location of the environment, the weather for the environment, the time of day, the date, an event type (e.g. a soccer game, a baseball game, a festival etc.) and any/or other details describing the environment. The contextual data may also provide data relating to/descriptions of the background characters that are to speak the background dialogue. The contextual data may also comprise game state data and/or data descriptive of real-world events as described above. The contextual data may be specified as text in natural language.

At step 403, the background audio is generated based upon processing the text data and the contextual data using one or more machine learning models. As discussed above, the background audio may include one or more sound effects based upon the contextual data. The one or more machine learning models may generate speech audio based upon the text data and the contextual data. For example, the one or more machine learning models can modify the text data based upon the contextual data to generate modified text data. The modified text data can be converted to speech audio based upon the contextual data using the one or more machine learning models. For example, the dialogue can be spoken in a way specified by the contextual data. The background sound effects and the generated speech audio can be mixed to provide the final background audio as an output. The generated background audio may therefore be customized according to the contextual data and the specified environment.

Figure 5:
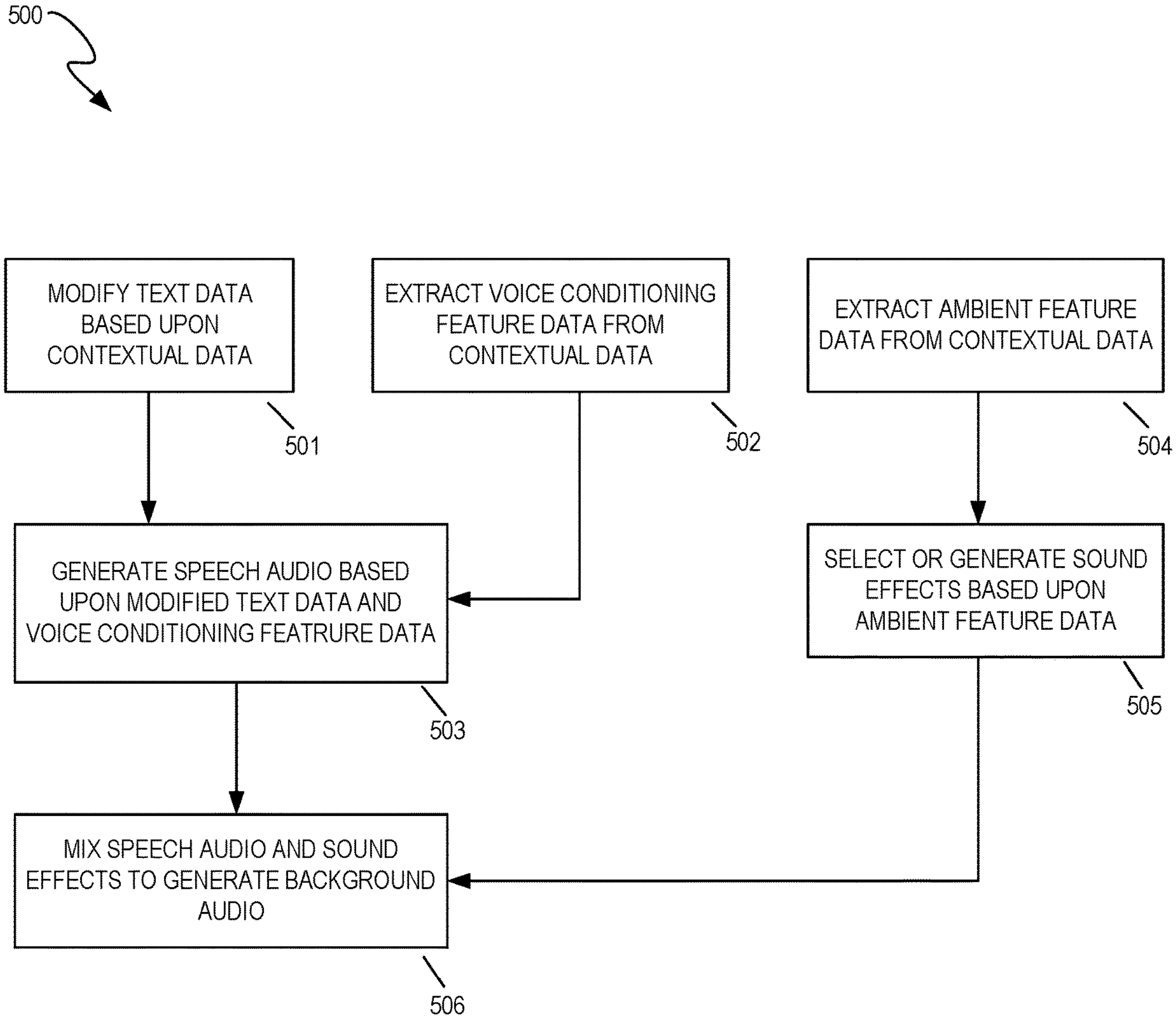
FIG. 5 is a flowchart illustrating an example method for generating background audio in a video game in more detail.

FIG. 5 is a flow diagram illustrating the background audio generation process, e.g. step 403 of FIG. 4, in more detail.

At step 501, the text data obtained at step 401 may be modified based upon the contextual data obtained at step 402. As discussed above, the modification may be carried out using a large language model. Modifications to the text data may include the addition of paralinguistic tokens and/or the addition/substitution of certain words or phrases in the text data based upon the contextual data. For example, the contextual data may indicate a particular speaking style and the text data may be modified to reflect that style.

At step 502, voice conditioning feature data may be extracted from the contextual data. As discussed above, voice conditioning feature data relates to how the speech audio should sound. The voice conditioning feature data may comprise prosody data. The prosody data may comprise labels or tags indicative of a speech style, emotion, expression and/or tone. The voice conditioning feature data may comprise speaker characteristic data. For example, the speaker's identity, age, gender, and/or accent. The prosody data may comprise lower-level prosody features such as the volume and/or pitch of the desired speech audio. The prosody data may comprise prosodic statistical features. The lower-level prosody features may be reflective of the speech style and/or speaker characteristics noted above.

The extraction of voice conditioning feature data may be carried out by a large language model which may be the same large language model as used in step 501 or may be a different large language model.

At step 503, speech audio may be generated based upon the modified text data and the voice conditioning feature data. For example, the speech audio may comprise utterances corresponding to the modified text data and spoken according to the voice conditioning feature data. As discussed above, this may be carried out using a text-to-speech machine learning model which may be a multi-speaker model. Any appropriate text-to-speech machine learning model may be used. For example, as discussed above, the model may comprise an encoder-decoder type architecture comprising a plurality of neural network layers. The encoder may comprise a text encoder to process the modified text data to generate a text embedding. The model may comprise a prosody encoder to generate a prosody embedding. The decoder may generate speech audio from the text embedding conditioned on the prosody embedding. The decoder may generate an output autoregressively or non-autoregressively as deemed appropriate by a person skilled in the art.

At step 504, ambient feature data may be extracted from the contextual data obtained at step 402. The ambient feature data may comprise features relating to the environment that are relevant for selecting/generating any background sound effects. For example, the ambient feature data may be indicative of an event type, type of environment, a room size, a size of a crowd, a noise type amongst others. As discussed above, the extraction of ambient feature data may be carried out using a large language model. The large language model may the same large language model as used in step 502 for extracting voice conditioning feature data. Alternatively, a separate large language model may be used.

At step 505, sound effects may be selected or generated based upon the ambient feature data extracted at step 504. As discussed above, the ambient feature data may comprise labels or tags or any other form of data that may be used to query and retrieve corresponding sound effects from an audio data store. Alternatively, the ambient feature data may comprise a text description that may be provided to a sound effect generation subsystem to generate corresponding sound effects.

At step 506, the speech audio generated at step 503 and the sound effects from step 505 may be mixed to generate the background audio. This may be carried out using any appropriate signal processing method.

In FIG. 5, certain steps are shown as being carried out in parallel. For example, steps 501, 502 and 504. It will be appreciated that as steps 501, 502 and 504 do not depend on each other, these steps may be carried out in parallel or may be carried out sequentially in any order. Steps 503 and 505 which are independent of each other, may also be carried out in parallel or in any sequential order once their respective pre-requisite steps have been performed.

Figure 6:
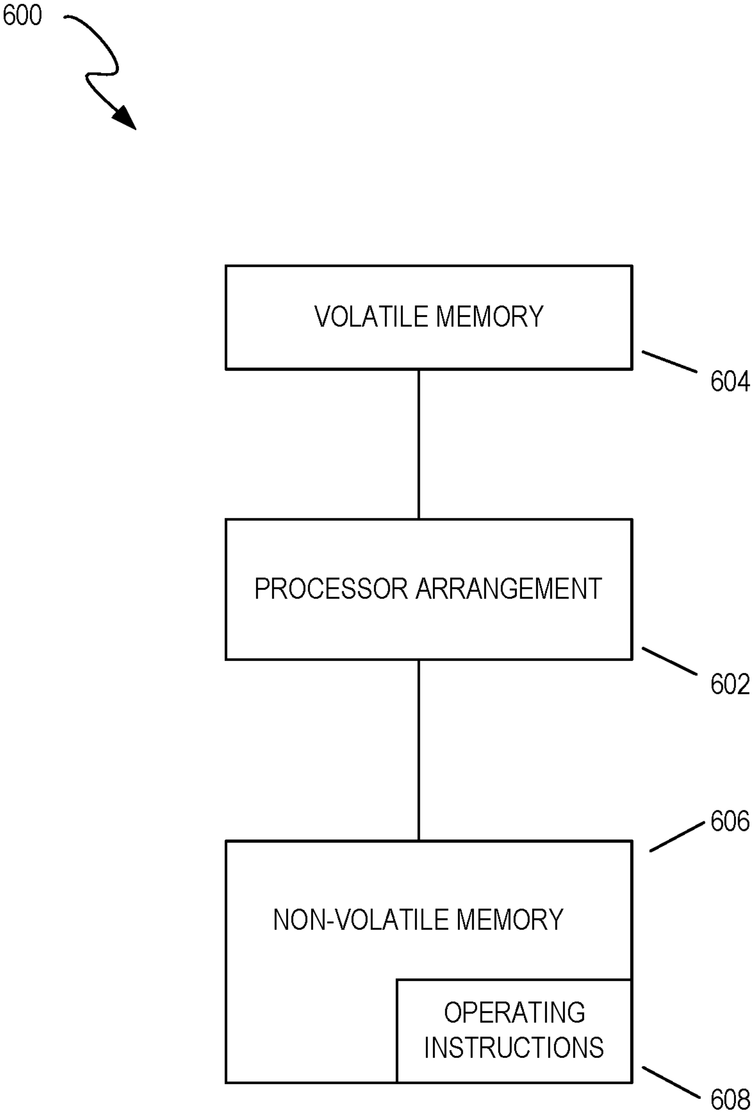
FIG. 6 shows a schematic example of a system/apparatus for performing any of the methods described herein.

FIG. 6 shows a schematic example of a system/apparatus 600 for performing any of the methods described herein. The system/apparatus shown is an example of a computing device. It will be appreciated by a person skilled in the art that other types of computing devices/systems may alternatively be used to implement the methods described herein, such as a distributed computing system.

The apparatus (or system) 600 comprises one or more processors 602. The one or more processors control operation of other components of the system/apparatus 600. The one or more processors 602 may, for example, comprise a general purpose processor. The one or more processors 602 may be a single core device or a multiple core device. The one or more processors 602 may comprise a central processing unit (CPU) or a graphical processing unit (GPU). Alternatively, the one or more processors 602 may comprise specialised processing hardware, for instance a RISC processor or programmable hardware with embedded firmware. Multiple processors may be included.

The system/apparatus comprises a working or volatile memory 604. The one or more processors may access the volatile memory 604 in order to process data and may control the storage of data in memory. The volatile memory 604 may comprise RAM of any type, for example Static RAM (SRAM), Dynamic RAM (DRAM), or it may comprise Flash memory, such as an SD-Card.

The system/apparatus comprises a non-volatile memory 606. The non-volatile memory 606 stores a set of operation instructions 608 for controlling the operation of the processors 602 in the form of computer readable instructions. The non-volatile memory 606 may be a memory of any kind such as a Read Only Memory (ROM), a Flash memory or a magnetic drive memory.

The one or more processors 602 are configured to execute operating instructions 608 to cause the system/apparatus to perform any of the methods described herein. The operating instructions 608 may comprise code (i.e. drivers) relating to the hardware components of the system/apparatus 600, as well as code relating to the basic operation of the system/apparatus 600. Generally speaking, the one or more processors 602 execute one or more instructions of the operating instructions 608, which are stored permanently or semi-permanently in the non-volatile memory 606, using the volatile memory 604 to temporarily store data generated during execution of said operating instructions 608.

Implementations of the methods described herein may be realised as in digital electronic circuitry, integrated circuitry, specially designed ASICs (application specific integrated circuits), computer hardware, firmware, software, and/or combinations thereof. These may include computer program products (such as software stored on e.g. magnetic discs, optical disks, memory, Programmable Logic Devices) comprising computer readable instructions that, when executed by a computer, such as that described in relation to FIG. 6, cause the computer to perform one or more of the methods described herein.

Any system feature as described herein may also be provided as a method feature, and vice versa. As used herein, means plus function features may be expressed alternatively in terms of their corresponding structure. In particular, method aspects may be applied to system aspects, and vice versa.

Furthermore, any, some and/or all features in one aspect can be applied to any, some and/or all features in any other aspect, in any appropriate combination. It should also be appreciated that particular combinations of the various features described and defined in any aspects of the invention can be implemented and/or supplied and/or used independently.

Although several embodiments have been shown and described, it would be appreciated by those skilled in the art that changes may be made in these embodiments without departing from the principles of this disclosure, the scope of which is defined in the claims.

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

What is claimed is:

1. A method for generating background audio in a video game, the method implemented by one or more processors, and the method comprising:

obtaining, by one or more of the processors, text data comprising text for speech audio that is to be present in the background audio;

obtaining, by one or more of the processors, natural language contextual data comprising a description of an environment in the video game; and generating, by one or more of the processors, the background audio based upon processing the text data and the contextual data using one or more machine learning models comprising:

modifying the text data, by a first large language model-based machine learning model, based upon the natural language contextual data; wherein the text data is modified based upon a speaking style indicated in the natural language contextual data that is different to the speaking style of the original text data;

extracting, by a second large language model-based machine learning model, voice conditioning feature data from the natural language contextual data;

generating, by a text-to-speech machine learning model, speech audio based upon the modified text data and the voice conditioning feature data; and wherein the background audio comprises the speech audio.

2. The method of claim 1, wherein the modified text data comprises one or more additional paralinguistic tokens.

3. The method of claim 1, wherein generating, by one or more of the processors, the background audio based upon processing the text data and the contextual data using one or more machine learning models comprises:

including one or more sound effects in the background audio based upon the contextual data.

4. The method of claim 3, wherein including one or more sound effects in the background audio based upon the contextual data comprises:

extracting, by a third large language model-based machine learning model, ambient feature data from the contextual data.

5. The method of claim 4, wherein including one or more sound effects in the background audio based upon the contextual data comprises:

selecting the one or more sound effects from an audio data store based upon the ambient feature data.

6. The method of claim 4, wherein including one or more sound effects in the background audio based upon the contextual data comprises:

generating, by one or more of the machine learning models, the one or more sound effects based upon the ambient feature data.

7. The method of claim 3, wherein generating, by one or more of the processors, the background audio based upon processing the text data and the contextual data using one or more machine learning models comprises:

mixing the speech audio and the one or more sound effects to generate the background audio.

8. The method of claim 1, wherein the voice conditioning feature data comprises prosody data and/or wherein the voice conditioning feature data comprises speaker characteristic data.

9. The method of claim 4, wherein the third large language model-based machine learning model used to extract the ambient feature data and the second large language model-based machine learning model used to extract the voice conditioning feature data are the same machine learning model.

10. The method of claim 1, wherein generating the background audio is further based upon processing game state data for the video game.

11. The method of claim 1, wherein generating the background audio is further based upon processing data descriptive of real-world events.

12. The method of claim 1, further comprising:

causing the generated background audio to be played in a running instance of the video game.

13. The method of claim 1, further comprising:

generating a plurality of background audio samples, wherein the plurality of background audio samples each comprise different spoken dialogue; and selecting, by a fourth large language model-based machine learning model, a subset of the plurality of background audio samples to generate background audio with extended dialogue.

14. A system comprising:

one or more processors; and one or more computer readable storage media comprising processor readable instructions to cause the one or more processors to carry out a method comprising:

obtaining, by one or more of the processors, text data comprising text for speech audio that is to be present in background audio of a video game;

obtaining, by one or more of the processors, natural language contextual data comprising a description of an environment in the video game; and generating, by one or more of the processors, the background audio based upon processing the text data and the contextual data using one or more machine learning models comprising:

modifying the text data, by a first large language model-based machine learning model, based upon the natural language contextual data; wherein the text data is modified based upon a speaking style indicated in the natural language contextual data that is different to the speaking style of the original text data;

extracting, by a second large language model-based machine learning model, voice conditioning feature data from the natural language contextual data;

generating, by a text-to-speech machine learning model, speech audio based upon the modified text data and the voice conditioning feature data; and wherein the background audio comprises the speech audio.

15. One or more non-transitory computer-readable storage media comprising instructions which, when executed by one or more processors, cause the one or more processors to carry out a method comprising:

obtaining, by one or more of the processors, text data comprising text for speech audio that is to be present in background audio of a video game;

obtaining, by one or more of the processors, natural language contextual data comprising a description of an environment in the video game; and generating, by one or more of the processors, the background audio based upon processing the text data and the contextual data using one or more machine learning models comprising:

modifying the text data, by a first large language model-based machine learning model, based upon the natural language contextual data; wherein the text data is modified based upon a speaking style indicated in the natural language contextual data that is different to the speaking style of the original text data;

extracting, by a second large language model-based machine learning model, voice conditioning feature data from the natural language contextual data;

generating, by a text-to-speech machine learning model, speech audio based upon the modified text data and the voice conditioning feature data; and wherein the background audio comprises the speech audio.

* * * * *